Figure 3:
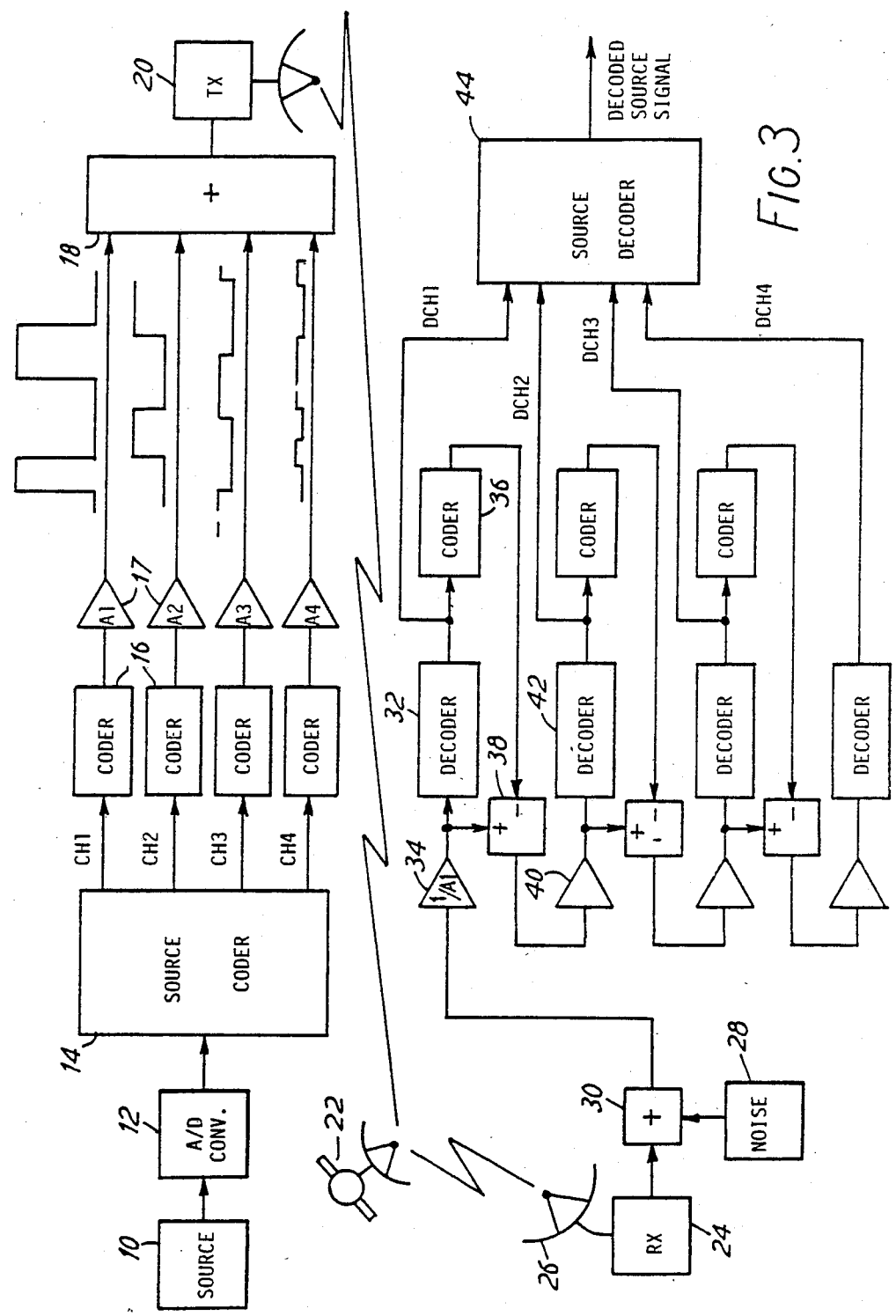

United States Patent [19]

Parker

[11] Patent Number: 4,903,125

[45] Date of Patent: Feb. 20, 1990

[54] METHOD AND APPARATUS FOR CONVEYING INFORMATION SIGNALS

[75] Inventor: Michael A. Parker, London, United Kingdom

[73] Assignee: British Broadcasting Corporation, London, England

[21] Appl. No.: 134,774

[22] PCT Filed: Dec. 19, 1986

[86] PCT No.: PCT/GB86/00783

§ 371 Date: Jan. 25, 1988

§ 102(e) Date: Jan. 25, 1988

[87] PCT Pub. No.: WO87/06418

PCT Pub. Date: Oct. 22, 1987

[30] Foreign Application Priority Data

Apr. 17, 1986 [GB] United Kingdom ................. 8609426

[51] Int. Cl.⁴ ........................ H04N 7/04; H04N 7/01; H04N 11/12
[52] U.S. Cl. .................................... 358/141; 358/140; 358/15; 375/38
[58] Field of Search ......................... 358/140, 141, 15; 375/38; 371/67, 68

[56] References Cited

U.S. PATENT DOCUMENTS

| | | | |
|---|---|---|---|
| 4,222,076 | 9/1980 | Knowlton | 358/133 |
| 4,567,518 | 1/1986 | Driessen | 358/133 |
| 4,567,519 | 1/1986 | Richard | 358/135 |
| 4,654,484 | 3/1987 | Reiffel et al. | 358/133 |
| 4,698,689 | 10/1987 | Tzou | 358/260 |

FOREIGN PATENT DOCUMENTS

| | | |
|---|---|---|
| 1120541 | 7/1968 | United Kingdom . |
| 1428963 | 3/1976 | United Kingdom . |
| 1518969 | 7/1978 | United Kingdom . |

OTHER PUBLICATIONS

"Step by Step Image Transmission and Display from Gross to Fine Information Using Hierarchical Coding", Yasuda et al., Trans. of Inst. of Electr. & Comm. Eng. of Japan, vol. E63, No. 4, Apr. 1980.

"Hierarchische Intraframe Codierung für einen Sequentiellen Bildaufbau", Coy, Frequenz, vol. 38, Jan. (1984), No. 1, Berlin, Deutschland, pp. 15-18.

"The Laplacian Pyramind as a Compact Image Code", Burt et al., IEEE, Transactions on Communication, vol. Com-31, No. 4, Apr. 1983, pp. 532-540.

"Progressive Transmission of Grey-Scale and Binary Pictures by Simple, Efficient, and Lossless Encoding Schemes"; K. Knowlton, Proceedings of the IEEE, vol. 68, No. 7, pp. 885-896, Jul. 1980.

Primary Examiner—John K. Peng
Attorney, Agent, or Firm—Robert F. O'Connell

[57] ABSTRACT

Video signals from a source are digitized and applied to a source coder which segregates the signals into four channels (CH1 to CH4) of progressively less visual significance. CH1 carries basic picture information at a relatively low resolution. CH2 to CH4 carry differential information at progressively higher resolutions. The four channels signals are applied to respective coders and the digital outputs are combined in a matrix with voltage levels falling off as visual significance decreases. Received signals, transmitted say by way of a satellite, are applied to a first, high level decoder which extracts the digital waveform for CH1 as DCH1. This is recoded and subtracted from the input to provide a signal to a decoder which recovers CH2 as DCH2, and so on. DCH1 to DCH4 are applied to a source decoder complementary to the coder to recover the source signal. Low significant channels can be omitted at the transmitter, or not be recovered at the receiver to adapt to the prevailing signal to noise performance.

19 Claims, 3 Drawing Sheets

+ PIXELS FOR n = 5

⊕ PIXELS FOR n = 4

◉ PIXELS FOR n = 3

◎ PIXELS FOR n = 2

FIG.1

FIG.2

| P11 | P12 | P21 | P22 |
| --- | --- | --- | --- |
| P13 | P14 | P23 | P24 |
| P31 | P32 | P41 | P42 |
| P33 | P34 | P43 | P44 |

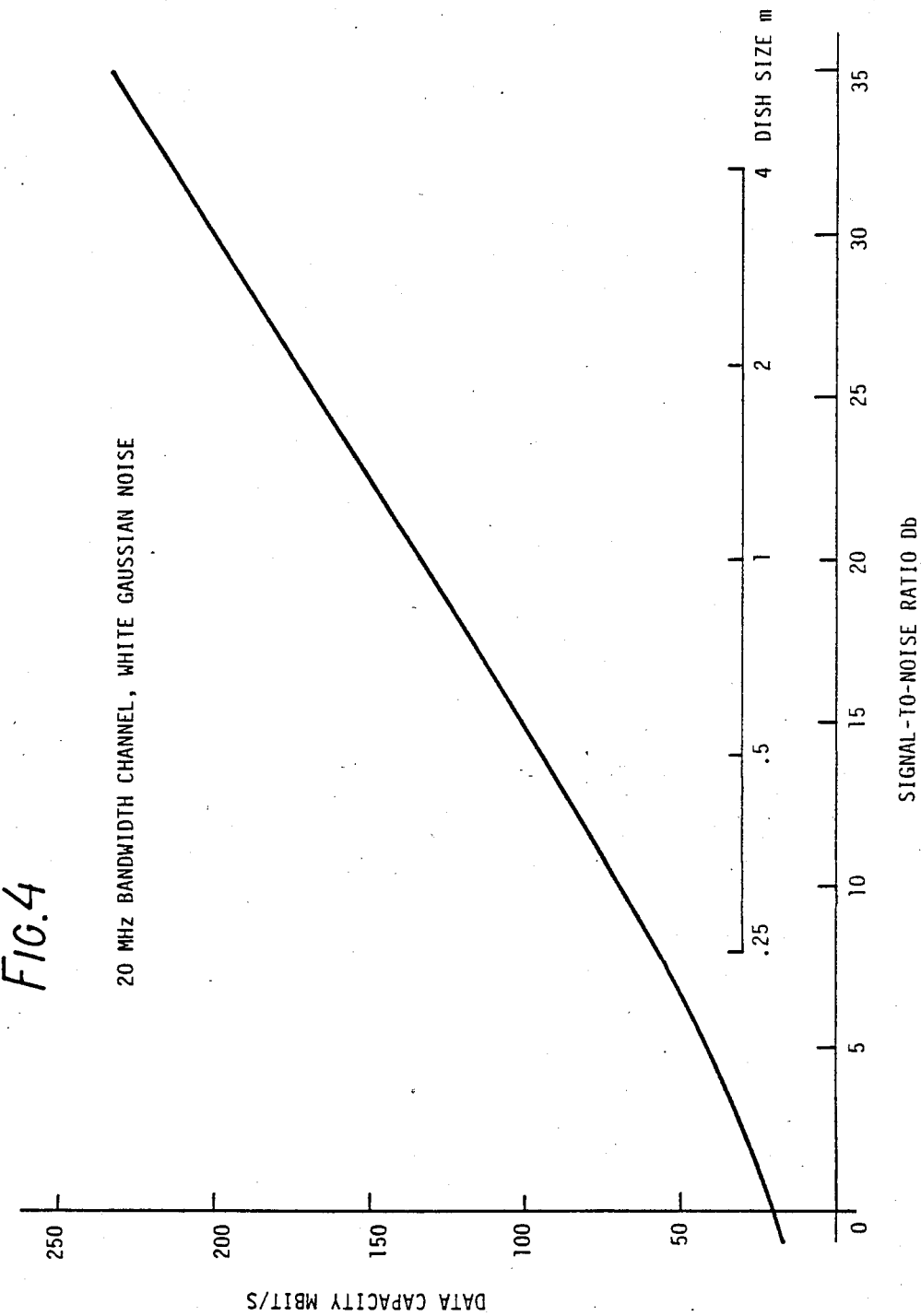

METHOD AND APPARATUS FOR CONVEYING INFORMATION SIGNALS

The present invention relates to a method and apparatus for conveying information signals, particularly (but not exclusively) television signals. In general television signals are conveyed from a source to a receiver by way of a medium. The medium may be a transmission medium (e.g. terrestrial or satellite radio, cable) or a storage medium (e.g. video cassette, optical disc). Many different sources are now available including studio and portable cameras, computers, tele-cine apparatus, and so on. There is a concomitent tendency for standards to proliferate if only to match the different bandwidths and/or signal to noise performances of different systems. Such proliferation is clearly undesirable.

A related problem arises in that it is often not possible to specify the bandwidth or signal to noise performance which is appropriate in a given system. There may vary in dependence upon fluctuating transmission medium characteristics, size of receiving antenna in the case of satellite radio transmission, changes in transmitter power, and so on. For brevity, the remaining description refers simply to bandwidth, although it is frequently the signal to noise performance which is actually the determining factor.

The object of the present invention is to provide a solution to the problems which thus arise, by means of a method and apparatus which allow adaptable standards to be set up within a universal system.

According to the invention in one aspect, there is provided a method of conveying television signals from a source to a receiver by way of a medium, wherein signals from the source are segregated into a plurality of channels corresponding to progressively less visually significant information, a composite signal is formed, for conveyance by the said medium, by a reversible combination of component signals from the said channels with the powers of the component signals varying directly in dependence on the significances of the channels, and wherein, at the receiver a number of the component signals are recovered from the composite signal conveyed to the receiver by the said medium and a television signal is formed from the recovered signals.

Such a method may be employed in the content of a heirarchy of standards, comprising a prime, maximum bandwidth standard and other standards requiring progressively less bandwidth, including a basic, minimum bandwidth standard. When the prime standard is appropriate, all the channels are employed at the source but, when lesser bandwidths are required, channels are progressively dropped, starting from the least significnt channel. The conveyed signals can include a label which informs the receiver as to the number of channels which have been employed.

The receiver can recover all of the component signals included in the conveyed composite signal. However the receiver does not have to recover all of the component signals. If for example the medium is noisy for any reason (fringe area reception, small receiving antenna, and so on) the receiver may ignore at least the least significant component signal included in the conveyed signal. This will enhance the received picture by cutting out displayed noise, although the picture will naturally have reduced detail.

The invention will be described in more detail, by way of example, with reference to the accompanying drawings, in which:

FIG. 1 is a diagram showing how different pixel resolutions are employed in a television frame, FIG. 2 is a diagram showing how a coarsest resolution pixel is progressively subdivided, FIG. 3 is a block diagram of apparatus embodying the invention, and FIG. 4 is a graph used in explaining receiver performance in direct broadcasting by satellite.

In order to allow a common transmitting and receiving system for all standards, it is desirable that the higher bandwidth standards are all subsets of the preceding standard. In particular, in the spatial domain, each standard should employ a finer sampling grid than the preceding standard but which contains the sampling points of the preceding standard.

The invention in various other aspects and advantageous developments of the invention are defined in the appended claims.

The invention will be described in the context of a heirarchical system of standards set out in the Table below. The left half of the Table gives the number of pixels per screen for six different spatial sampling levels denoted by $n=0$ to $n=5$, with progressive subdivision of the sampling grid. The right half of the Table gives the consequent pixel rate for each of four different temporal sampling levels denoted by $m=1$ to $m=4$.

| | | | | | m | | |
|---|---|---|---|---|---|---|---|
| | | | | 1 | 2 | 3 | 4 |
| | | | | | Frames/second | | |
| | | | | 12.5 | 25 | 50 | 100 |
| | PIXELS | | | PIXELS/ | | | |
| n | Horizontal | Vertical | Frame | SECOND | | (Millions) | |
| 0 | 128 | 64 | 8.2 k | 0.1 | 0.2 | 0.4 | 0.8 |
| 1 | 256 | 128 | 33 k | 0.4 | 0.8 | 1.6 | 3.3 |
| 2 | 512 | 256 | 130 k | 1.6 | 3.3 | 6.6 | 13 |
| 3 | 1024 | 512 | 520 k | 6.6 | 13 | 26 | 52 |
| 4 | 2048 | 1024 | 2 M | 26 | 52 | 105 | 209 |
| 5 | 4096 | 2048 | 8.4 M | 105 | 209 | 419 | 838 |

FIG. 1 shows the pixel structure. Crosses represent the pixels at the highest resolution, i.e. $n=5$ in the above example. Progressively larger circles pick out the pixels in the progressively lower resolution screens. FIG. 1 does not indicate pixel sizes. FIG. 2 shows one pixel P at the lowest resolution ($n=0$) partitioned into four pixels $P_1$ to $P_4$ at the next resolution, each partitioned into four pixels $P_{11}$ to $P_{14}$, $P_{21}$ to $P_{24}$, etc. For simplicity, further partitioning is not shown.

If the symbols P etc are now taken to denote the information content of the pixel (e.g. digital R, G and B or Y, U and V values), the $n=0$ frame is fully defined by the set of 8.2k P values. The $n=1$ frame can be fully defined by these values plus 33k differential values, where the four differential values for every P are:

$$DP_1 = P_1 - P$$

$$DP_2 = P_2 - P$$

$$DP_3 = P_3 - P$$

$$DP_4 = P_4 - P$$

This procedure can be continued in a heirarchical fashion so that we have $DP_{11} = P_{11} - P_1$ $DP_{12} = P_{12} - P_1$ and so on.

This heirarchical structure makes possible an advantageous method of transmission in accordance with the invention, whereby a first channel is used to carry the P information, a second channel is used to carry the $DP_{1-4}$ information, a third channel is used to carry the $DP_{11-44}$ information, and so on, with progressively decreasing powers in a composite signal.

So far as temporal resolution is concerned, if frames are always regarded as nominally occurring at 100/second, every frame is used for m=4, every second frame for m=3, every fourth frame for m=2 and every eighth frame for m=1. The heirarchical approach explained above in relation to the spatial domain can be extended to the temporal domain.

Let $P_0(T_1)$ denote the basic set of pixel values for every eighth frame with n=0 and m=1. The set of pixel values for the intervening frames when n=0 and m=2 are $P_0(T_2)$ and these are represented as:

$P_0(T_2) = P_0(T_1) + DP_0(T_2)$, i.e. the intervening frames are given by the values for the basic frames plus differential values $DP_0(T_2)$, which are transmitted in a channel assigned thereto.

If all the pixel rates in the above Table are considered, it will be seen that up to 20 different bandwidths can be established by use of a basic channel carrying the n=0, m=1 information and 19 differential channels carrying differential data pertaining to progressively higher spatial and temporal resolutions. FIG. 3 illustrates an apparatus which can be used in the transmission and reception of such segregated information.

FIG. 3 shows a source 10 of a video signal feeding an analog to digital converter 12 operating at a selected top pixel rate, e.g. the highest rate of the above table. The digital values are fed to a source coder 14 which comprises a multiple frame digital store and hardware/software means for forming differences such as to form on channel CH1 the basic pixel information $P_0(T_1)$ and on channels CH2 etc (for simplicity only four channels CH1 to CH4 are shown) the differential information pertaining to the higher temporal and spatial resolutions.

Each channel feeds a corresponding coder 16 which codes the information into a pulse waveform in accordance with a suitable pulse code. Suitable pulse codes for transmitting digital television are known in themselves. The coders feed amplifiers 17 with progressively smaller gains (A1 to A4). The outputs of the amplifiers, which are at progressively smaller amplitude levels, as symbolized by the adjacent waveforms, are combined in a summing network 18 to form a composite signal to be conveyed. By way of example, FIG. 3 shows the signal being conveyed via a transmitter 20, satellite 22 and receiver 24 with receiver dish antenna 26. The injection of receiver noise is symbolized by a noise source 28 and mixer 30.

The received signal is applied to a decoder 32 for channel 1 with a level set by an amplifier 34, such that the decoder 32 only extracts the data for the most significant channel, denoted DCH1. The amplifier 34 thus has a gain which, symbolically at least, is 1/A1.

The DCH1 data is re-coded by a coder 36 identical to each of the coders 16 and the output of this coder is subtracted in a mixer 38 from the output of the amplifier 34 to create a signal containing only the differential information of channels CH2, 3, 4. This signal is amplified to a suitable level by an amplifier 40 such that a decoder 42 can extract the decoded channel 2 data DCH2. The circuitry is repeated, as can be seen in FIG. 3 to extract DCH3 and DCH4.

The decoded signals DCH1-4 are applied to a source decoder 44 which complements the source coder 14 and recreates the video signal by a process of successive interpolations. For example, since $DP_1 = P_1 - P$ is the equation used to form $DP_1$, on reception $P_1$ can be recovered using the equation $P_1 = P + DP_1$.

Note that, although there may be a universal standard catering for all possible resolutions (bandwidths), in any given implementation it will obviously be sensible to provide only that amount of hardware consistent with the available and desired bandwidth. For smaller bandwidth applications, a reduced number of channel coders 16 will be employed. The data format, in particular the number of channels CH1, CH2, etc is preferably transmitted as a label, a technique too well known in itself to require description here.

At the receiving end there may be the same number of decoders 32, 42 etc as there are coders 16 but if there is a lot of receiver noise it will be better to omit one or more least significant decoders. If too many decoders are active the least significant ones will be affected by the noise from the source 28 and will produce visible noise. The control over the number of receiver channels may be a matter of receiver design for an intended application, by way of presets adjusted to suit a particular installation site or by way of an operator control. However, it will be possible to design "intelligent" receivers capable of decoding the labels and displaying pictures originated on all levels of the heirarchy, although with a resolution limited in each case by the display device and processing.

The compatibility between the different levels of the hierarchy can be achieved by suitable choices of sampling structures and coding, such that each level contains all the data from those levels beneath it. Thus higher levels could use a finer sampling grid, but one that also contains the sampling points of lower levels as in the example already described.

The sampling structures could also be selected to accommodate existing picture origination and display standards e.g. PAL, NTSC, film, NHK-HDTV.

The advantages of this approach are considerable. Many different source signal formats could be used with a single display device and with a common interface. In contrast, within the present PAL environment there is already a choice of baseband or UHF-composite, YUV or RGB signals. Many computers and work-stations use their own individual standards.

Having established the heirarchical principle, improved systems could be adopted without the problem of compatibility with existing equipment or the delays of agreeing further standards.

From the outset, those broadcasters with higher capacity channels could support higher quality services. Conversely, those services that did not require a high-quality picture, e.g. local community TV, could implement lower-quality systems and yet still be received by those viewers with high quality displays, but whose receivers have the intelligence explained above.

Receiver and source-equipment manufacturers could support the standards they chose with a guarantee of compatibility with other equipment. Individual parts of the chain could be upgraded as permitted by advancing technology.

As the number of broadcast services increases and as technology gives rise to higher definition picture sources and displays, it seems likely that there will be increasing demands on the available RF spectrum. As a result, any limitation in the received piture quality of a future television system, will probably be imposed by the broadcast channel. It is therefore important that any future broadcast transmission code should make efficient use of the available channel capacity.

Various advanced digital coding schemes have already been proposed for satellite applications. However, these provide a fixed data rate over a well defined channel. For broadcast use, the requirements are different. The characteristics of the channel will vary, both from receiver to receiver (because of differing dish sizes and geographical locations) and with time (satellite transmissions will probably increase in power as time progresses).

One of the drawbacks of direct digital transmission is the limitation imposed by the worst-case signal reception. With a simple p.c.m. link carrying its maximum data capacity (where this is limited by gaussian noise) a small variation in carrier-to-noise ratio will cause a large variation in error rate. As more advanced coding techniques are used (which allow the information limit of the channel to be approached more closely), this threshold region, between satisfactory and unsatisfactory reception, becomes narrower still. The data capacity of the transmission system is therefore limited to that achieved under worst-case conditions, so penalising the majority of subscribers. In contrast, an analogue transmission link provides the maximum available information capacity under prevailing conditions; for example, an improved television carrier-to-noise ratio results in an improved picture signal-to-noise ratio. However, the user may not be in a position to take full advantage of such improved channel capacity; for example, he may not be able to see the improved noise performance. Instead he may prefer better resolution or movement portrayal if these were available. This kind of overall optimisation of the use of a variable capacity channel is difficult to achieve with analogue modulation techniques but can be achieved using digital signals.

Thus, the apparatus described with reference to FIG. 3 employs a modulation process which provides an improved data throughput with improved channel signal-to-noise ratio. The extra data bits so gained are used to fill in fine detail, to provide more bits per pixel or provide more frames per second. The extra data is transmitted at a lower power, such that it does not interfere with the decoding of the more significant data. There are several layers of reducing significance, where the number of layers is limited by the best expected signal-to-noise for the channel.

This technique can be applied to the direct broadcasting of television by satellite. Here, the channel capacity is determined primarily by the receiving dish size, the geographical location and the satellite transmission power. Taking a WARC satellite channel as an example, the theoretical maximum data capacity for a 20 MHz channel at 14 dB s/n (0.5 m dish aerial, worst case reception) is 94 Mbit/s. FIG. 4 plots data capacity against signal to noise ratio. Assuming a capacity of only 0.6 of the maximum where possible in practice, the data capacity would become 56 Mbit/s. On this basis, and assuming the received signal power to be proportional to the area of the receiving dish, a portable 0.25 m dish should receive 34 Mbit/s and a large 2 m dish 100 Mbit/s. With a 15 dB improvement in transmission power from the satellite and use of the full 27 MHz bandwidth, a data rate of 200 Mbit/s should be possible.

In this way, those viewers wishing to invest in large dish aerials could receive a high definition service while a compact portable set could provide a picture quality comparable with the present PAL system. As receiver technology advanced and satellite transmissions became more powerful, picture quality would automatically improve.

As indicated above, the invention is not limited to use with televisin signals. In the case of audio, for example, the less significant information may relate to higher audio frequencies.

I claim:

1. A method of conveying television signals from a source to a receiver by way of a medium, comprising the steps of segregating signals from the source into component signals in a corresponding plurality of channels corresponding to progressively less visually significant information, forming a composite signal, for conveyance by the said medium, by subjecting the component signals from the said channels to a combining operation to form a composite signal with the powers of the component signals in the composite signal varying directly in dependence on the visual significance of the information in the channels, the combining operation being such as to be reversible to recover the component signals from the composite signal, and, at the receiver, recovering a number of the component signals from the composite signal conveyed to the receiver by the said medium and forming a television signal from the recovered signals.

2. A method according to claim 1, wherein the number of recovered signals is less than the number of channels.

3. A method according to claim 2, wherein the number of recovered signals is adjusted in dependence upon at least one of the bandwidth and/or signal to noise performance of the medium, the bandwidth and/or signal to noise performance of the receiver and the resolution of a display device of the receiver.

4. A method according to claim 1, wherein the number of channels is variable and the composite signal includes a label indicating at least the number of channels in the signal conveyed to the receiver.

5. A method according to claim 4, wherein the receiver is responsive to the label to recover the number of component signals indicated by the label.

6. A method according to claim 1, wherein the component signals are digitally coded and are additively combined in the composite signal with amplitudes varying directly in dependence on the significances of the channels.

7. A method according to claim 6, wherein the component signals are recovered from the received composite signal in accordance with components of the composite signal in different amplitude ranges.

8. A method according to claim 1, wherein the channels correspond to different levels of a heirarchy of increasing spatial and/or temporal resolution.

9. A method according to claim 8, wherein there are a plurality of standards in the spatial domain, each employing a finer sampling grid than the preceding standard but which contains the sampling points of the preceding standard.

10. A method according to claim 9, wherein each finer sampling grid has twice as many pixels in the horizontal direction and/or in the vertical direction as the grid of the preceding standard.

11. A method according to claim 1, wherein the most significant channel carries signals defining a basic minimum bandwidth picture and each other channel carries signals representing differences relative to the preceding channel.

12. A method of conveying television signals from a source to a receiver by way of a medium, comprising the steps of segregating signals from the source into component signals in a corresponding plurality of channels corresponding to progressively less visually significant information, forming a composite signal, for conveyance by the said medium, by subjecting the component signals from the said channels to a combining operation to form a composite signal with the powers of the component signals in the composite signal varying directly in dependence on the significance of the information in the channels, the combining operation being such as to be reversible to recover the component signals from the composite signal, and, at the receiver, recovering a number of the component signals from the composite signal conveyed to the receiver by the said medium and reconstituting an information signal from the recovered signals.

13. Apparatus for transmitting information signals from a source thereof, comprising first coding means which segregate the information signals into a plurality of channels which carry progressively less significant information, second coding means which code the signals in the channels into respective coded signals with power levels varying directly with said information significance, and combining means which combine the coded signals into a composite signal in accordance with a combining operation such as to be reversible to recover the component signals from the composite signal.

14. Apparatus according to claim 13, wherein the second coding means comprise a plurality of digital coders individual to the channels and amplifiers on the outputs of the coders having gains varying directly with significance.

15. Apparatus according to claims 13 or 14, wherein the first coding means provide a basic information signal in a first of the channels and a series of differential information signals in the other channels, each representing a difference from the information conveyed via the preceding channel(s).

16. Apparatus for recovering an information signal from a received composite signal including components with different power levels corresponding to different levels of information comprising a series of decoding means operative to detect and decode successively lower levels of information in the received composite signal in accordance with the power levels thereof, and further decoding means operative to decode the signals from the series of decoding means into the information signal.

17. Apparatus according to claim 16, wherein the series of decoding means comprise a first decoding means operative to detect and decode a high level component in the received signal and an ordered plurality of second decoding means, each of which is operative to detect and decode a corresponding level component in a residual signal, and means for forming the residual signal comprising means for re-coding the component detected and decoded by the preceding decoding means and means for subtracting the re-coded signal from the input to said preceding decoding means.

18. Apparatus according to claim 17, wherein the further decoding means creates the information signal from the decoded high level component successively interpolated in the spatial and/or time domain in accordance with the other decoded components decoded by the second decoding means.

19. A method of recovering information from a signal containing coded information at different amplitude levels, comprising the steps of decoding the signal at a succession of decreasing signal amplitude levels $n = 1, 2$ and so on such that, at each level n the coded information for subsequent levels $n+1$ and so on does not influence the decoding, and re-coding the resultant decoded signal at each level and subtracting the re-coded signal from the signal which was decoded at the level n to form the signal which is decoded at level $n+1$.

* * * * *